(12) United States Patent
Jeong et al.

(10) Patent No.: US 11,312,262 B2
(45) Date of Patent: Apr. 26, 2022

(54) APPARATUS AND METHOD FOR CONTROLLING IMAGE RECORDING OF VEHICLE

(71) Applicants: HYUNDAI MOTOR COMPANY, Seoul (KR); KIA MOTORS CORPORATION, Seoul (KR)

(72) Inventors: Dong Hyuk Jeong, Hwaseong-si (KR); Yu Seok Kim, Seoul (KR); Dong Hun Han, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 193 days.

(21) Appl. No.: 16/773,082

(22) Filed: Jan. 27, 2020

(65) Prior Publication Data
US 2021/0016677 A1    Jan. 21, 2021

(30) Foreign Application Priority Data
Jul. 18, 2019    (KR) .................... 10-2019-0087198

(51) Int. Cl.
*G05D 1/00*   (2006.01)
*B60L 58/13*   (2019.01)
*G05D 1/02*   (2020.01)
*G06V 20/56*   (2022.01)

(52) U.S. Cl.
CPC ............ *B60L 58/13* (2019.02); *G05D 1/0225* (2013.01); *G06V 20/56* (2022.01); *G05D 2201/0213* (2013.01)

(58) Field of Classification Search
None
See application file for complete search history.

(56) References Cited

U.S. PATENT DOCUMENTS

2018/0308293 A1* 10/2018 DeCia ................. G07C 5/0808
2018/0367731 A1* 12/2018 Gatti .................. G06K 9/00791
2019/0122460 A1*  4/2019 Reyes .................... G08G 1/166

* cited by examiner

*Primary Examiner* — James M McPherson
(74) *Attorney, Agent, or Firm* — Morgan, Lewis & Bockius LLP

(57) ABSTRACT

An apparatus for controlling image recording of a vehicle includes: an input device that receives image recording setting information; and a controller that determines whether to control charging of a battery or an image recording operation according to whether the image recording setting information is input and whether the vehicle is in a starting state, thus controlling image recording while a vehicle is parked without the need for a separate battery and reducing an unnecessary increase in cost.

19 Claims, 6 Drawing Sheets

APPARATUS AND METHOD FOR CONTROLLING IMAGE RECORDING OF VEHICLE

CROSS-REFERENCE TO RELATED APPLICATION

This application claims the benefit of priority to Korean Patent Application No. 10-2019-0087198, filed in the Korean Intellectual Property Office on Jul. 18, 2019, the entire contents of which are incorporated herein by reference.

TECHNICAL FIELD

The present disclosure relates to an apparatus and a method for controlling image recording of a vehicle.

BACKGROUND

An image recording apparatus photographs and stores an image of surroundings of a vehicle while driving and parking of a vehicle. When the image recording apparatus is mounted in the vehicle, an auxiliary battery for the image recording apparatus is mounted to prevent discharge of a starter battery, and the additional mounting of the auxiliary battery causes an increase in cost. Accordingly, a method using a 12V low-voltage battery capable of controlling the operation of the image recording apparatus without increasing the cost has been proposed. However, when the 12V low-voltage battery is used, the battery is capable of operating only for a certain time after the vehicle has been stopped. Therefore, there is a problem that the 12V low voltage battery is discharged before the image recording operation is performed for the time set by the user or the remaining battery capacity may be discharged in the near future because it is used for dark current even when the 12V low voltage battery operates for the time set by the user.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides an apparatus and method for controlling image recording of a vehicle which can prevent discharge of a vehicle battery.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling image recording of a vehicle includes: an input device that receives image recording setting information; and a controller that determines whether to control charging of a battery or an image recording operation according to whether the image recording setting information is input and whether the vehicle is in a starting state.

The image recording setting information may include time information of the image recording operation when the vehicle is parked.

The controller may perform a control to fully charge the battery when it is determined that the image recording setting information is input and the vehicle is in the starting state.

The controller may calculate a charge amount corresponding to the image recording setting information and perform a control to charge the battery additionally by the calculated charge amount when it is determined that the image recording setting information is input and the vehicle is in the starting state.

The controller may control the image recording operation according to whether a battery charge amount is received in real time when it is determined that the image recording setting information is input and the vehicle is not in the starting state.

The controller may calculate an available image recording time based on the battery charge amount received in the starting state of the vehicle and a charge amount corresponding to the image recording setting information when it is not possible to receive the battery charge amount in real time.

The controller may control the image recording operation based on the calculated time.

The controller may determine whether the image recording operation is possible based on the battery charge amount received in real time and a charge amount corresponding to the image recording setting information when it is possible to receive the battery charge amount in real time.

The controller may control the image recording operation based on the battery charge amount received in real time when it is determined that the image recording operation is possible.

The controller may not control the charging of the battery or the image recording operation when the image recording setting information is not input.

According to another aspect of the present disclosure, a method for controlling image recording of a vehicle includes: determining whether image recording setting information is input; and determining whether to control charging of a battery or an image recording operation according to whether the image recording setting information is input and whether the vehicle is in a starting state.

The image recording setting information may include condition information for image recording when the vehicle is parked.

The method may further include performing a control to fully charge the battery when it is determined that the image recording setting information is input and the vehicle is in the starting state.

The method may further include: calculating a charge amount corresponding to the image recording setting information; and performing a control to charge the battery additionally by the calculated charge amount when it is determined that the image recording setting information is input and the vehicle is in the starting state.

The method may further include controlling the image recording operation according to whether a battery charge amount is received in real time when it is determined that the image recording setting information is input and the vehicle is not in the starting state.

The method may further include: receiving the battery charge amount in the starting state of the vehicle when it is not possible to receive the battery charge amount in real time; and calculating an available image recording time based on the battery charge amount in the starting state of the vehicle and a charge amount corresponding to the image recording setting information.

The method may further include controlling the image recording operation based on the calculated time.

The method may further include determining whether the image recording operation is possible based on the battery charge amount received in real time and a charge amount corresponding to the image recording setting information when it is possible to receive the battery charge amount in real time.

The method may further include controlling the image recording operation based on the battery charge amount received in real time when it is determined that the image recording operation is possible.

The method may further include finishing the charging of the battery or the image recording operation when the image recording setting information is not input.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
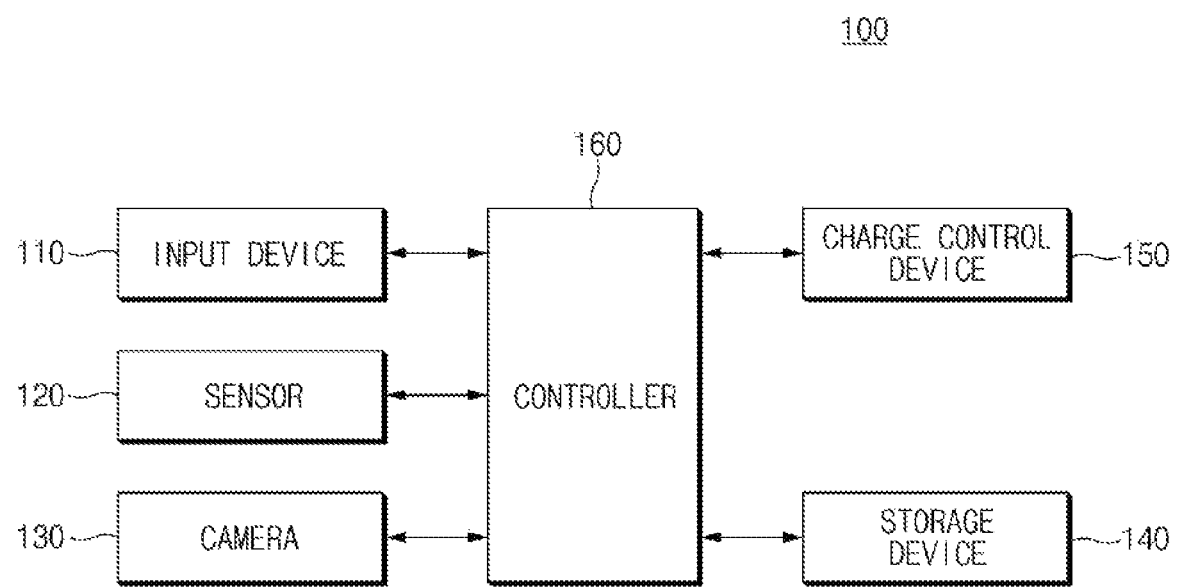
FIG. 1 is a diagram illustrating a configuration of an apparatus for controlling image recording of a vehicle according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of an apparatus for controlling image recording of a vehicle according to an exemplary embodiment of the present disclosure.

As illustrated in FIG. 1, an apparatus 100 for controlling image recording of a vehicle according to an exemplary embodiment of the present disclosure may include an input device 110, a sensor 120, a camera 130, a storage device 140, a charge control device 150, and a controller 160.

The input device 110 may receive at least one of a user's manipulation, operation, and speech. In detail, the input device 110 may receive image recording setting information using at least one of a user's manipulation, operation, and speech. Here, the image recording setting information may include condition information for image recording when a vehicle is parked, and for example, may include time information for recording an image when the vehicle is parked.

The input device 110 may include at least one of a scroll wheel, a button, a knob, a touch screen, a touch pad, a lever, a track ball, a motion sensor, and a speech recognition sensor or a combination thereof.

The sensor 120 may obtain a variety of information of the vehicle. According to an exemplary embodiment of the present disclosure, the sensor 120 may include a starting state detecting sensor, a battery sensor, and the like. The controller 160 may determine whether the vehicle is in a starting state based on the information obtained by the sensor 120 or determine a battery state information (a remaining capability).

The camera 130 may include an image sensor and a processor. The camera 130 may process a still image or a moving image obtained by the image sensor (e.g., CMOS or CCD). The processor may extract necessary information by processing the still image or the moving image obtained through the image sensor, and may transmit the extracted information to the controller 160. The camera 130 may perform an image recording operation to obtain a still image or a moving image according to a control signal received from the controller 160, or may not perform the image recording operation not to obtain a still image or a moving image.

The storage device 140 may store a still image or a moving image captured by the camera 130. In addition, the storage device 140 may store an algorithm, a program, and the like for operating the apparatus for controlling the image recording of the vehicle. The storage device 140 may include at least one medium of a flash memory, a hard disk, a memory card, a Read-Only Memory (ROM), a Random Access Memory (RAM), an Electrically Erasable Programmable Read-Only Memory (EEPROM) Memory, a Programmable Read-Only Memory (PROM), a magnetic memory, a magnetic disk, and an optical disk.

The charge control device 150 may receive power from a power supply device (not shown) to control the charging of a battery mounted in the vehicle. Here, the power may refer to power supplied from a generator (alternator) provided in the vehicle or supplied through regenerative braking. In the case of a hybrid vehicle or an electric vehicle, the charge control device 150 may control the charging of a 12V low-voltage battery using a power supplied from a high voltage battery for driving of the vehicle. The charge control device 150 may operate to receive a control signal from the controller 160 to charge the battery at a specific charge amount. Here, the battery may include a battery provided in a hybrid vehicle, an electric vehicle, and an engine driving vehicle.

The controller 160 may be implemented by various processing devices such as a microprocessor incorporating a semiconductor chip or the like capable of operating or executing various instructions, and may control the overall operation of an apparatus for controlling image recording of the vehicle of the present disclosure. Specifically, when the input device 110 receives image recording setting information, the controller 160 may control the charging of the battery or the image recording operation based on the charge amount corresponding to the image recording setting information according to whether the vehicle is in a starting state. Here, the image recording setting information may include condition information for the image recording when the vehicle is parked, which is input from the input device 110 according to at least one of a user's manipulation, operation, and speech. For example, the condition information for image recording may include time information for recording an image when the vehicle is parked.

The controller 160 may determine whether the vehicle is in a starting state based on the information obtained from the sensor 120. According to an exemplary embodiment of the present disclosure, the controller 160 may control the charging operation of the battery when it is determined that the vehicle is in the starting state, and may control an image recording operation when it is determined that the vehicle is not in the starting state.

Hereinafter, a configuration of controlling the charging operation when the controller 160 determines that the vehicle is in a starting state will be described.

When the controller 160 determines that the vehicle is in the starting state, the controller 160 may determine whether the input device 110 receives image recording setting information through at least one of a user's manipulation, operation, and speech. That is, the controller 160 may determine whether there is image recording setting information set by a user.

The controller 160 may control the charging operation such that the battery mounted in the vehicle is fully charged when it is determined that the image recording setting information is input from the user. Here, the full charge may refer to a state in which the SOC of the battery is 100%.

In addition, when it is determined that the image recording setting information is input from the user, the controller 160 may calculate a charge amount corresponding to the image recording setting information based on the image recording setting information. That is, the controller 160 may calculate the charge amount required to record images for an image recording time set by the user at the time of parking based on user image recording time information included in the image recording setting information. The controller 160 may control the charging operation of the charge control device 150 to further charge the battery until it reaches a calculated charge amount.

On the other hand, when the controller 160 determines that the vehicle is in the starting state, and determine that the image recording setting information is not input from the user, the controller 160 may finish the control of the charging operation.

As described above, according to the present disclosure, when the controller 160 determines that the vehicle is in a starting state, the controller 160 may calculate a charge amount corresponding to the image recording setting information to additionally charge the battery with the calculated charge amount, or perform control to fully charge the battery to secure the charge amount required to record an image during the image recording time. Accordingly, in the present disclosure, the image recording operation may be performed while the charge amount is secured when the vehicle is in the starting state to prevent the battery from being discharged by the image recording operation when the vehicle is parked.

Next, a configuration of controlling the image recording operation when the controller 160 determines that the vehicle is not in the starting state will be described. In the present disclosure, when it is determined that the vehicle is not in the starting state, the controller 160 may control the image recording operation based on the information of the battery. According to an exemplary embodiment of the present disclosure, the controller 160 may control the image recording operation differently in a case where it is impossible to receive the battery information in real time and a case where it is possible to receive the battery information in real time.

First, when the controller 160 is not able to receive the battery information from the sensor 120 in real time, the controller 160 may receive the charge amount of the battery in the starting state of the vehicle and calculate an available image recording time based on the charge amount of a battery received in the starting state and the charge amount corresponding to the image recording setting information. In addition, the controller 160 may calculate the available image recording time by reflecting the dark current (the current used to perform the basic operation of the vehicle control device) to be consumed during the parking period of the vehicle to secure a reference charge amount (e.g., SOC 50%) so as not to discharge the battery. Accordingly, the controller 160 may calculate an available image recording time based on the remaining charge amount calculated by subtracting the reference charge amount used to consume the dark current during the predetermined parking period, from the charge amount of the battery received in the starting state of the vehicle.

The controller 160 may perform control to execute the image recording operation for the calculated time, and determine whether the image recording has actually been performed for the calculated time. For example, when the calculated time is 2 hours, the controller 160 may perform control to perform the image recording for 2 hours, and determine whether 2 hours have elapsed after the image recording operation is performed. When the controller 160 determines that the image recording is performed for the calculated time, the controller 160 may perform control to finish the image recording operation. On the other hand, the controller 160 may perform control to perform the image recording for a calculated time, but when the starting state is detected in a state where the calculated time has not elapsed actually, and finish the image recording operation even when the image recording has not performed for the calculated time.

Next, in a case where the controller 160 is able to receive the battery information from the sensor 120 in real time, the controller 160 may receive the battery charge amount in real time and determine whether the image recording operation is possible based on the charge amount corresponding to the battery charge amount received in real time and the image recording setting information. In detail, the controller 160 may determine whether the image recording operation is possible in a state where a reference charge amount that does not discharge the battery is secured by reflecting the dark current consumed during the parking period of the vehicle. Accordingly, the controller 160 may determine whether image recording is possible based on the remaining charge amount calculated by subtracting the reference charge amount used to consume the dark current during a predetermined parking period from the charge amount of the battery received in real time.

When the controller 160 determines that the image recording is possible, the controller 160 may determine whether the image recording has been performed for the time (user setting time) actually included in the image recording setting information. For example, when the time included in the image recording setting information is 3 hours, the controller 160 may determine whether 3 hours have elapsed after the image recording operation is performed. When the controller 160 determines that the image recording has been performed for the user setting time, the controller 160 may perform control to finish the image recording operation. On the other hand, the controller 160 may perform control to operate during the user setting time, but finish the image recording operation even through the image recording operation is not performed during the user setting time in a state where the starting state is detected when the user setting time has not elapsed.

As described above, when the controller 160 determines that the vehicle is not in the starting state, the controller 160 may calculate an available image recording time based on the charge amount of the battery received in the starting state, and perform the image recording operation for the calculated time. Alternatively, the controller 160 may determine whether the image recording operation is possible based on the charge amount of the battery received in real time, and when it is determined that the image recording operation is possible by the charge amount of the battery received in real time, the controller 160 may perform the image recording operation to prevent the battery from being discharged.

Figure 2:
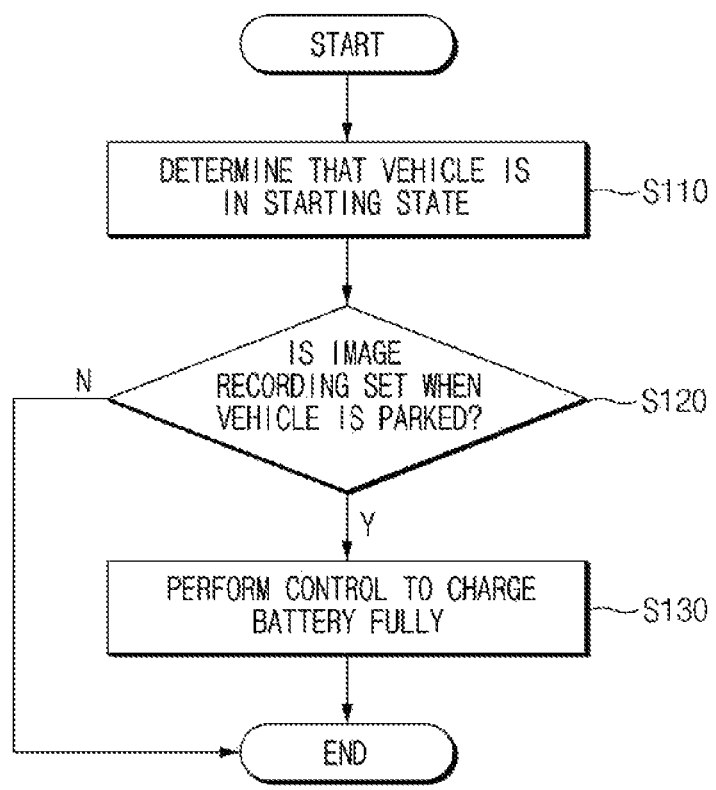
FIG. 2 is a diagram illustrating a flowchart of a method of controlling image recording of a vehicle while driving according to an exemplary embodiment of the present disclosure.

FIG. 2 is a diagram illustrating a flowchart of a method of controlling image recording of a vehicle while driving according to an exemplary embodiment of the present disclosure.

As illustrated in FIG. 2, the controller 160 may determine whether a vehicle is in a starting state based on information obtained from the sensor 120 (S110). When the vehicle is in the starting state, the controller 160 may determine whether the input device 110 receives the image recording setting information (S120). When the controller 160 determines that the input device 110 has received the image recording setting information (Y) in S120, that is, when the controller 160 determines that the image recording setting information has been input from a user while a vehicle is being parked, the controller 160 may control a charging operation of the charge control device 150 such that the battery mounted in the vehicle is fully charged. On the other hand, when it is determined in step S120 that the image recording setting information is not input (N), the controller 160 may finish the control of the charging operation. In S130, the controller 160 may control the charging operation of the charge control device 150 such that the state of charge SOC of the battery is 100%.

Figure 3:
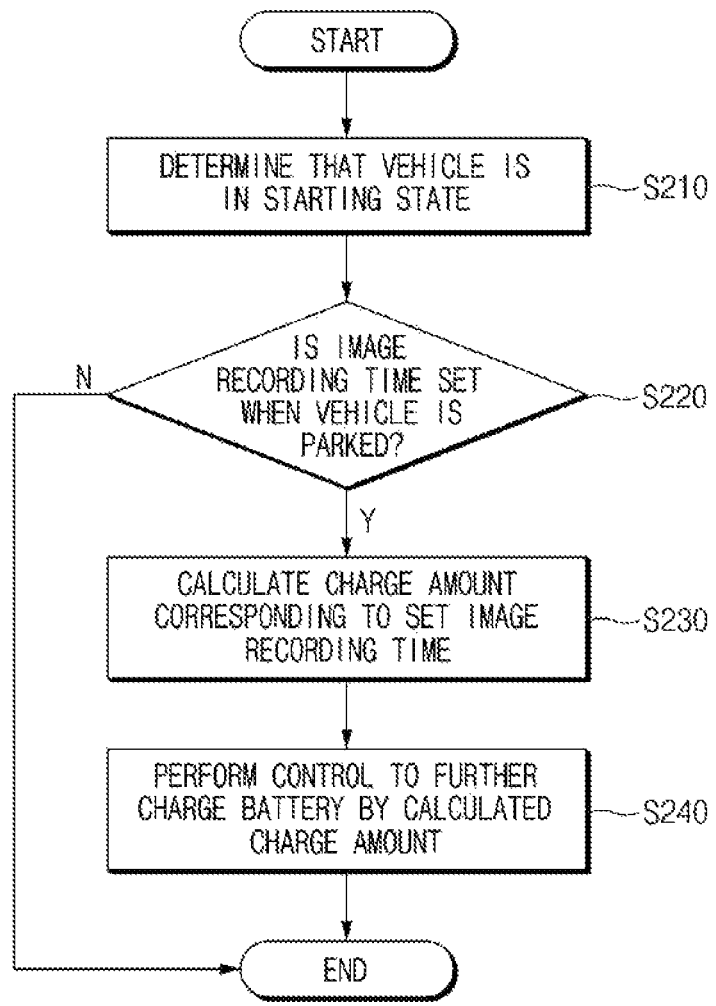
FIG. 3 is a diagram illustrating a flowchart of a method for controlling image recording of a vehicle during driving according to another exemplary embodiment of the present disclosure.

FIG. 3 is a diagram illustrating of a flowchart of a method of controlling image recording of a vehicle during driving according to another exemplary embodiment of the present disclosure.

As illustrated in FIG. 3, the controller 160 may determine that a vehicle is in a starting state based on information obtained from the sensor 120 (S210). When the vehicle is in the starting state, the controller 160 may determine whether the input device 110 receives image recording setting information (S220). In S220, when it is determined that the input device 110 has received the image recording setting information (Y), that is, when it is determined that the image recording setting information during the parking has been input by the user, the controller 160 may calculate a charge amount corresponding to an image recording time included in the image recording setting information (S230). That is, in S230, the controller 160 may calculate a charge amount required to record an image during the image recording time set by the user when the vehicle is parked based on the user image recording time information included in the image recording setting information. On the other hand, when it is determined in S220 that the image recording setting information have not been received (N), the controller 160 may finish the control of the charging operation.

The controller 160 may control the charging operation of the charge control device 150 to further charge the battery by the charge amount calculated in S230 (S240).

According to the present disclosure, when the controller 160 determines that the vehicle is not in the starting state, the controller 160 may control the image recording operation based on the information of the battery. According to an exemplary embodiment of the present disclosure, the controller 160 may control the image recording operation differently in a case where it is not possible to receive the information of the battery in real time and a case where it is possible to receive the information of the battery in real time. The case where it is not possible to receive the battery information will be described with reference to FIG. 4, and the case where it is possible to receive the battery information will be described with reference to FIG. 5.

Figure 4:
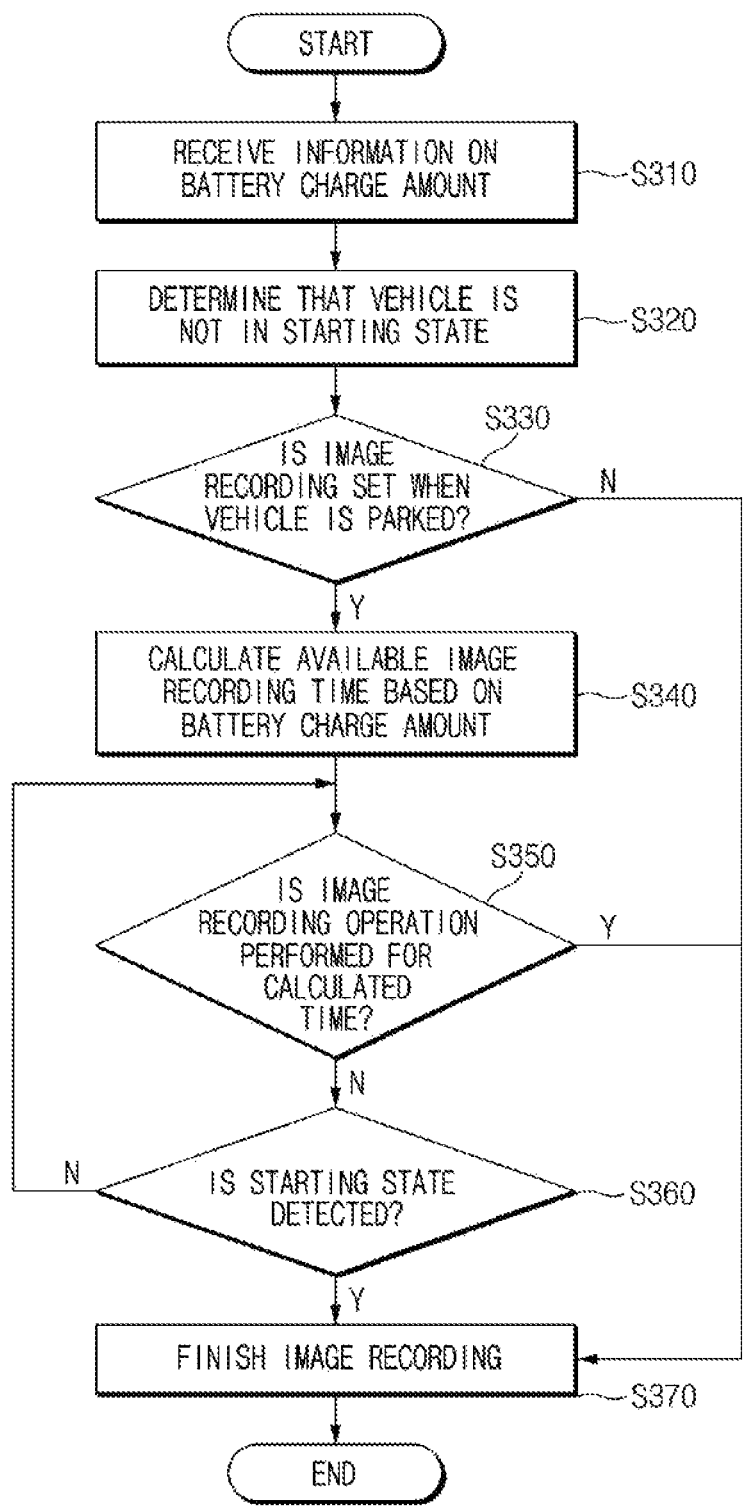
FIG. 4 is a diagram illustrating a flowchart of a method of controlling image recording of a vehicle during parking according to an exemplary embodiment of the present disclosure.

FIG. 4 is a diagram illustrating a flowchart of a method of controlling image recording of a vehicle during parking according to an exemplary embodiment of the present disclosure.

FIG. 4 illustrates a case in which the controller 160 is not able to receive the battery information from the sensor 120 in real time, and therefore, the controller 160 may receive the charge amount of the battery in the starting state of the vehicle (S310). The controller 160 may determine that the vehicle is not in the starting state based on the information obtained from the sensor 120 (S320). The controller 160 may determine whether image recording setting information is input by a user (S330). In S330, the controller 160 may determine whether the image recording setting information is input in the starting state of the vehicle.

When it is determined in S330 that the image recording setting information is input (Y), the controller 160 may calculate an available image recording time based on the charge mount of the battery received in S310 and the charge amount corresponding to the image recording setting information (S340). In S340, the controller 160 may calculate an available image recording time based on the remaining charge amount calculated by subtracting a reference charge amount, used to consume the dark current during a predetermined parking period, from the charge amount of the battery received in the starting state of the vehicle. When it is determined in S330 that the image recording setting information is not input (N), the controller 160 may perform control to finish the image recording operation (S370).

The controller 160 may perform control to perform the image recording operation for the calculated time, and determine whether the image recording operation is actually performed for the calculated time (S350). In S350, when the calculated time is 2 hours, the controller 160 may perform control to perform the image recording operation for 2 hours, and may determine whether 2 hours have elapsed after the image recording operation is performed. When the controller 160 determines that the image recording operation is performed for the calculated time (Y), the controller 160 may perform S370. When it is determined in S350 that the image recording operation is not performed for the calculated time (N), the controller 160 may determine whether a starting state is detected (S360). In S360, the controller 160 may perform S370 when the starting state is detected even though the image recording operation is not performed for the calculated time. On the other hand, in S360, when the starting state is not detected, the controller 160 may perform S350.

Figure 5:
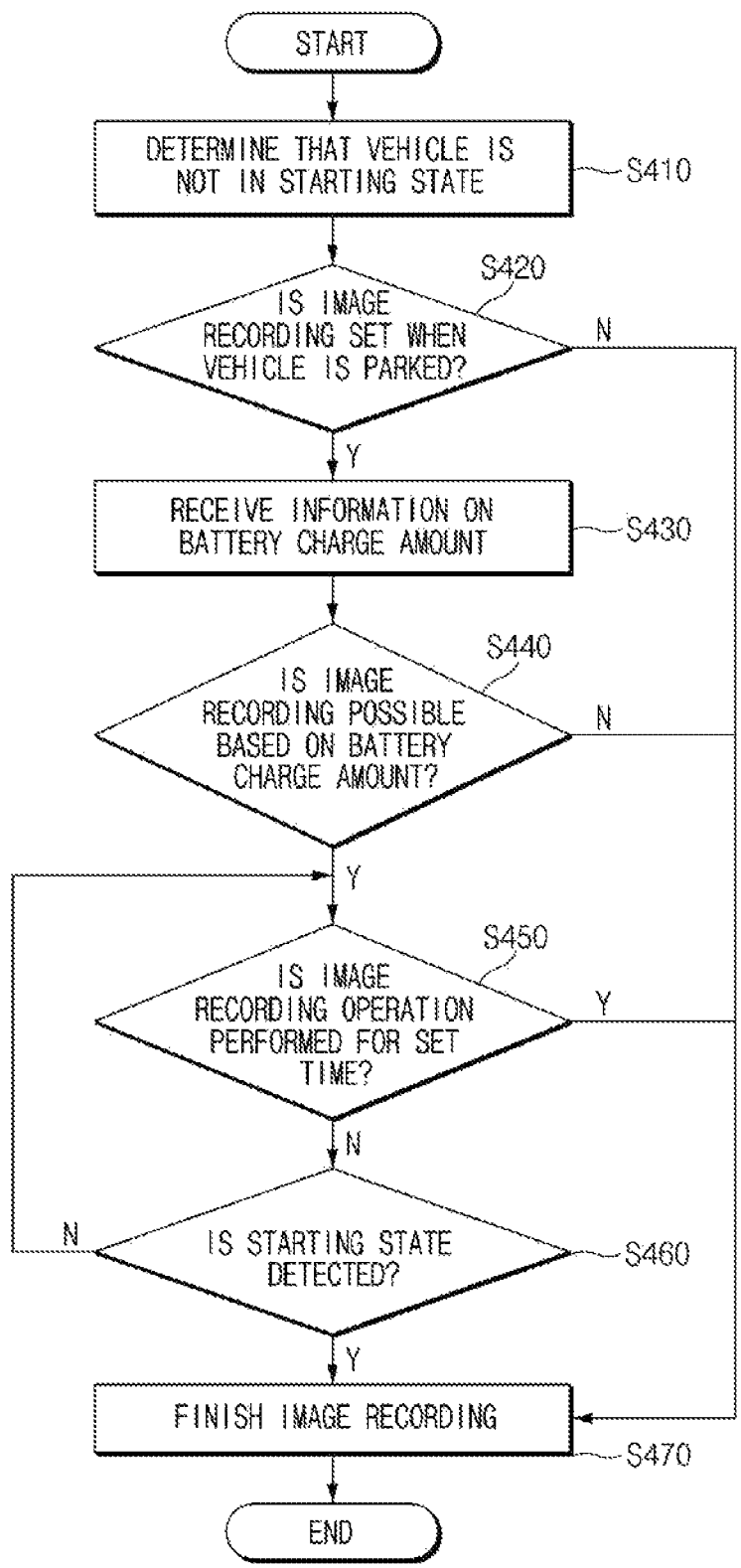
FIG. 5 is a diagram illustrating a flowchart of a method for controlling image recording of a vehicle during parking according to another exemplary embodiment of the present disclosure.

FIG. 5 is a diagram illustrating a flowchart of a method for controlling image recording of a vehicle during parking according to another exemplary embodiment of the present disclosure.

FIG. 5 illustrates a case in which the controller 160 is capable of receiving the battery information from the sensor 120 in real time, and therefore, the controller 160 does not need to receive the charge amount of the battery in the starting state of the vehicle.

The controller 160 may determine that the vehicle is not in the starting state based on information obtained from the sensor 120 (S410). The controller 160 may determine whether image recording setting information is input from a user (S420). In S420, the controller 160 may determine whether the image recording setting information is input in the starting state of the vehicle. When it is determined in S420 that the image recording setting information is input (Y), the controller 160 may receive information on the battery charge amount from the sensor 120 in real time (S430). When it is determined in S420 that the image recording setting information is not input (N), the controller 160 may perform control to finish the image recording operation (S470).

The controller 160 may determine whether the image recording operation is possible based on the battery charge amount received in S430 and the charge amount corresponding to the image recording setting information (S440). In S440, the controller 160 may determine whether the image recording operation is possible based on the remaining charge amount calculated by subtracting a reference charge amount used to consume the dark current during the predetermined parking period from the battery charge amount received in real time.

When it is determined in S440 that the image recording operation is impossible (N), the controller 160 may perform control to finish the image recording operation (S470).

On the other hand, if it is determined in S440 that the image recording operation is possible (Y), the controller 160 determines whether the image recording has been performed during the time (user setting time) actually included in the image recording setting information (S450). When it is determined in S450 that the image recording operation has been performed for a user setting time (Y), the controller 160 may perform S470. When it is determined in S450 that the image recording operation have not been performed for the user setting time (N), the controller 160 may determine whether a starting state is detected (S460). In S460, when the starting state is detected even though the image recording operation is not performed for the user setting time (Y), the controller 160 may perform S470. On the other hand, in S460, when the starting state is not detected, the controller 160 may perform S450.

Figure 6:
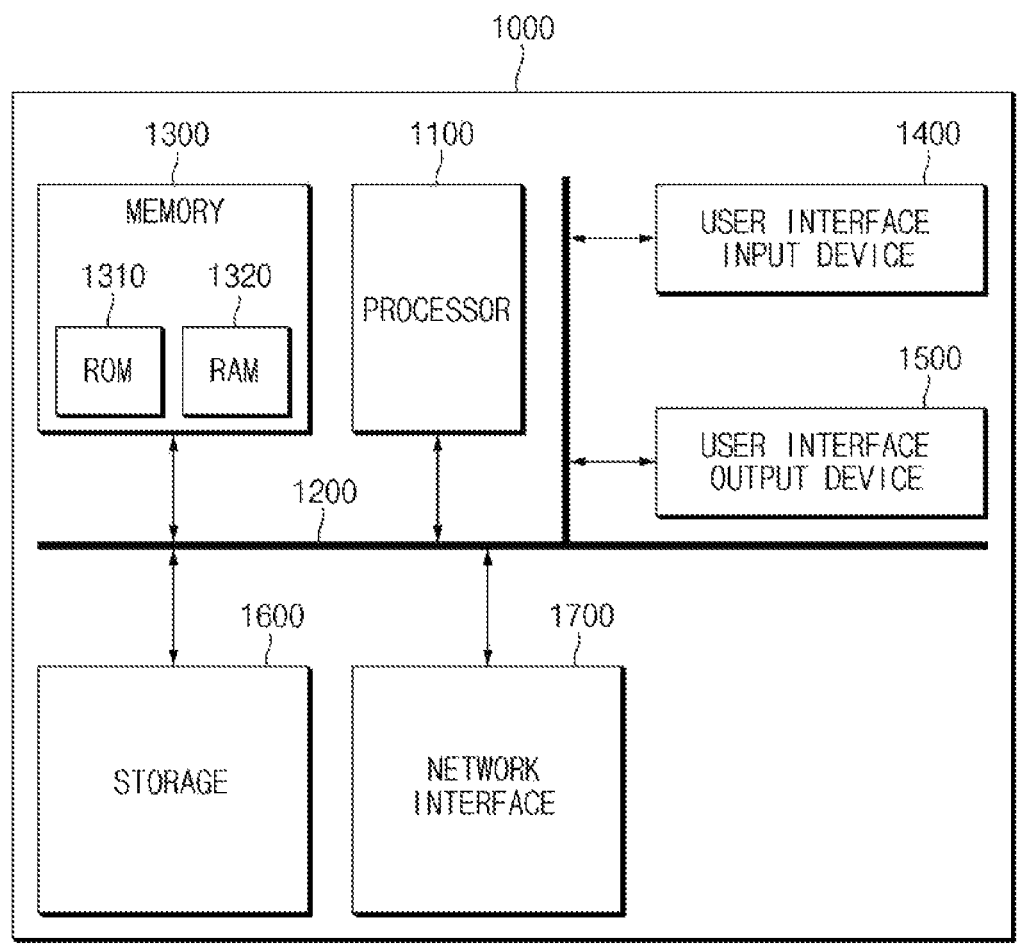
FIG. 6 illustrates a configuration of a computing system for executing a method according to an exemplary embodiment of the present disclosure.

FIG. 6 illustrates a configuration of a computing system for executing a method according to an exemplary embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The apparatus and method for controlling image recording of a vehicle according to the embodiments of the present disclosure may control image recording while parking without using an auxiliary battery, thereby reducing unnecessary cost increase. In addition, it is possible to prevent the battery of the vehicle from being discharged by considering the remaining battery capability when controlling the image recording during parking.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling image recording of a vehicle comprising:
an input device configured to receive image recording setting information; and
a controller configured to determine whether to control charging of a battery or an image recording operation according to whether the image recording setting information is input and whether the vehicle is in a starting state,
wherein the controller controls the image recording operation according to whether a battery charge amount is received when it is determined that the image recording setting information is input and the vehicle is not in the starting state.

2. The apparatus of claim 1, wherein the image recording setting information includes time information of the image recording operation when the vehicle is parked.

3. The apparatus of claim 1, wherein the controller performs a control to fully charge the battery when it is determined that the image recording setting information is input and the vehicle is in the starting state.

4. The apparatus of claim 1, wherein the controller calculates a charge amount corresponding to the image recording setting information and performs a control to charge the battery additionally by the calculated charge amount when it is determined that the image recording setting information is input and the vehicle is in the starting state.

5. The apparatus of claim 1, wherein the controller calculates an available image recording time based on the battery charge amount received in the starting state of the vehicle and a charge amount corresponding to the image recording setting information when it is not possible to receive the battery charge amount in real time.

6. The apparatus of claim 5, wherein the controller controls the image recording operation based on the calculated time.

7. The apparatus of claim 1, wherein the controller determines whether the image recording operation is possible based on the battery charge amount received in real time and a charge amount corresponding to the image recording setting information when it is possible to receive the battery charge amount in real time.

8. The apparatus of claim 7, wherein the controller controls the image recording operation based on the battery charge amount received in real time when it is determined that the image recording operation is possible.

9. The apparatus of claim 1, wherein the controller does not control the charging of the battery or the image recording operation when the image recording setting information is not input.

10. A method for controlling image recording of a vehicle comprising:
determining whether image recording setting information is input;
determining whether to control charging of a battery or an image recording operation according to whether the image recording setting information is input and whether the vehicle is in a starting state; and
controlling the image recording operation according to whether a battery charge amount is received when it is determined that the image recording setting information is input and the vehicle is not in the starting state.

11. The method of claim 10, wherein the image recording setting information includes condition information for image recording when the vehicle is parked.

12. The method of claim 10, further comprising performing a control to fully charge the battery when it is determined that the image recording setting information is input and the vehicle is in the starting state.

13. The method of claim 10, further comprising:
calculating a charge amount corresponding to the image recording setting information; and
performing a control to charge the battery additionally by the calculated charge amount when it is determined that the image recording setting information is input and the vehicle is in the starting state.

14. The method of claim 10, further comprising:
receiving the battery charge amount in the starting state of the vehicle when it is not possible to receive the battery charge amount in real time; and
calculating an available image recording time based on the battery charge amount in the starting state of the vehicle and a charge amount corresponding to the image recording setting information.

15. The method of claim 14, further comprising controlling the image recording operation based on the calculated time.

16. The method of claim 10, further comprising determining whether the image recording operation is possible based on the battery charge amount received in real time and a charge amount corresponding to the image recording setting information when it is possible to receive the battery charge amount in real time.

17. The method of claim 16, further comprising controlling the image recording operation based on the battery charge amount received in real time when it is determined that the image recording operation is possible.

18. The method of claim 10, further comprising finishing the charging of the battery or the image recording operation when the image recording setting information is not input.

19. The apparatus of claim 1, wherein the battery charge amount is received in real time.

* * * * *